United States Patent
Ohno

(10) Patent No.: US 10,458,461 B2
(45) Date of Patent: Oct. 29, 2019

(54) BEARING SHAFT AND BEARING

(71) Applicant: NTN CORPORATION, Osaka-shi, Osaka (JP)

(72) Inventor: Yasunobu Ohno, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/060,388

(22) PCT Filed: Dec. 6, 2016

(86) PCT No.: PCT/JP2016/086215
§ 371 (c)(1),
(2) Date: Jun. 7, 2018

(87) PCT Pub. No.: WO2017/099071
PCT Pub. Date: Jun. 15, 2017

(65) Prior Publication Data
US 2018/0363694 A1   Dec. 20, 2018

(30) Foreign Application Priority Data

Dec. 9, 2015 (JP) ................................ 2015-240277
Dec. 9, 2015 (JP) ................................ 2015-240278

(51) Int. Cl.

| | | |
|---|---|---|
| *F16C 3/02* | (2006.01) | |
| *F16C 33/62* | (2006.01) | |
| *F16C 33/66* | (2006.01) | |
| *F16C 33/36* | (2006.01) | |
| *F16C 33/54* | (2006.01) | |
| *C21D 9/40* | (2006.01) | |
| *C23C 8/32* | (2006.01) | |
| *F16C 33/64* | (2006.01) | |
| *C21D 1/06* | (2006.01) | |
| *C21D 1/18* | (2006.01) | |

(52) U.S. Cl.
CPC .................. *F16C 3/02* (2013.01); *C21D 9/40* (2013.01); *C23C 8/32* (2013.01); *F16C 33/36* (2013.01); *F16C 33/546* (2013.01); *F16C 33/62* (2013.01); *F16C 33/64* (2013.01); *F16C 33/6677* (2013.01); *C21D 1/06* (2013.01); *C21D 1/18* (2013.01); *C21D 2211/001* (2013.01); *F16C 2361/61* (2013.01)

(58) Field of Classification Search
CPC .... C23C 8/32; C21D 9/40; C21D 1/06; C21D 1/18; F16C 3/02; F16C 33/62; F16C 33/6677; F16C 33/36; F16C 33/546; F16C 33/64; F16C 2361/61
See application file for complete search history.

(56) References Cited

U.S. PATENT DOCUMENTS

2004/0079310 A1   4/2004  Suzuki et al.
2007/0151634 A1   7/2007  Fujita

FOREIGN PATENT DOCUMENTS

| JP | 2005-282854 A | 10/2005 |
| JP | 2005-314794 A | 11/2005 |
| JP | 2006-071022 A | 3/2006 |
| JP | 2009-019639 A | 1/2009 |
| JP | 2015-007265 A | 1/2015 |

OTHER PUBLICATIONS

Search Report issued in corresponding International Patent Application No. PCT/JP2016/086215, dated Feb. 21, 2017.

*Primary Examiner* — Jessee R Roe
(74) *Attorney, Agent, or Firm* — McDermott Will & Emery LLP

(57) ABSTRACT

The present invention relates to a bearing shaft provided with an outer peripheral surface that includes a raceway surface (side surface) on which a rolling element rolls. The bearing shaft is made of steel containing carbon of 0.7% or more. The raceway surface is forming with a nitrogen-enriched layer. The absolute value of compressive residual stress in the surface of the nitrogen-enriched layer (i.e., the surface of a hardened layer which is formed on the side surface of the bearing shaft by shot peening) is 600 MPa or more and 1700 MPa or less. Thereby, it is possible for the present invention to prolong the operation life of a bearing.

12 Claims, 4 Drawing Sheets

BEARING SHAFT AND BEARING

CROSS REFERENCE

This application is the U.S. National Phase under 35 US.C. § 371 of International Application No. PCT/JP2016/086215, filed on Dec. 6, 2016, which claims the benefit of Japanese Application No. 2015-240277, filed on Dec. 9, 2015 and Japanese Application No. 2015-240278, filed on Dec. 9, 2015, the entire contents of each are hereby incorporated by reference.

TECHNICAL FIELD

The present invention relates to a bearing shaft and a bearing, and more particularly to a bearing shaft used in such a bearing that an outer ring thereof is rotated.

BACKGROUND ART

Conventionally, a bearing is known to be used in a mechanical device such as a planetary gear speed reducer. The bearing is used in such a manner that the outer ring thereof is rotated. In this case, since the load region on the bearing shaft positioned on the inner ring is always at the same position, there is such a problem that the operation life of the bearing shaft is shortened due to fatigue peeling.

In order to deal with such a problem, for example, Japanese Patent Laying-Open No. 2015-7265 discloses a technique for forming a hardened layer on the surface of a bearing shaft. According to the technique, after a bearing shaft is made of alloy steel containing 0.1 to 0.5% by mass of carbon and other alloy elements, it is subjected to a carbonitriding treatment, a high-frequency quenching treatment and a tempering treatment, and thereafter, a shot peening treatment is performed on the bearing shaft so as to form a hardened layer on the surface of the bearing shaft.

According to Japanese Patent Laying-Open No. 2015-7265, it is possible to sufficiently increase the surface hardness of the bearing shaft by forming the hardened layer mentioned above on the surface of the bearing shaft, and to improve the rolling fatigue strength or the peeling resistance of the bearing shaft by imparting compressive residual stress into the hardened layer.

CITATION LIST

Patent Document

PTD 1: Japanese Patent Laying-Open No. 2015-7265

SUMMARY OF INVENTION

Technical Problem

However, in a mechanical device such as a planetary gear speed reducer mentioned above, since the bearing shaft is used under relatively severe conditions, due to the fatigue peeling, the operation life of the bearing shaft is shortened, which thereby restricts the operation life of the entire mechanical device. Therefore, the durability of the bearing shaft is required to be further improved.

The present invention has been made in view of the aforementioned problems, and it is therefore an object of the present invention to provide a bearing shaft and a bearing superior in durability.

Solution to Problem

The bearing shaft according to the present invention is provided with an outer peripheral surface that includes a raceway surface on which a rolling element rolls, and is made of steel containing carbon of 0.7% or more. The raceway surface is formed with a nitrogen-enriched layer. The absolute value of compressive residual stress in the surface of the nitrogen-enriched layer is 600 MPa or more and 1700 MPa or less.

The bearing according to the present invention comprises a bearing shaft provided with an outer peripheral surface that includes a raceway surface, and a rolling element that has a surface in contact with the raceway surface. The bearing shaft is made of steel containing carbon of 0.7% or more. The raceway surface is formed with a nitrogen-enriched layer. The absolute value of compressive residual stress in the surface of the nitrogen-enriched layer is 600 MPa or more and 1700 MPa or less, and the amount of residual austenite in an outer portion of the surface of the rolling element is greater than the amount of residual austenite in an outer portion of the nitrogen-enriched layer formed on the raceway surface of the bearing shaft.

Advantageous Effects of Invention

According to the present invention, it is possible to prolong the operation life of the bearing shaft.

DESCRIPTION OF EMBODIMENTS

Hereinafter, an embodiment of the present invention will be described with reference to the drawings. It should be noted that in the following drawings, the same or equivalent portions will be denoted by the same reference signs and the description thereof will not be repeated.

<Structure of Bearing>

Figure 1:
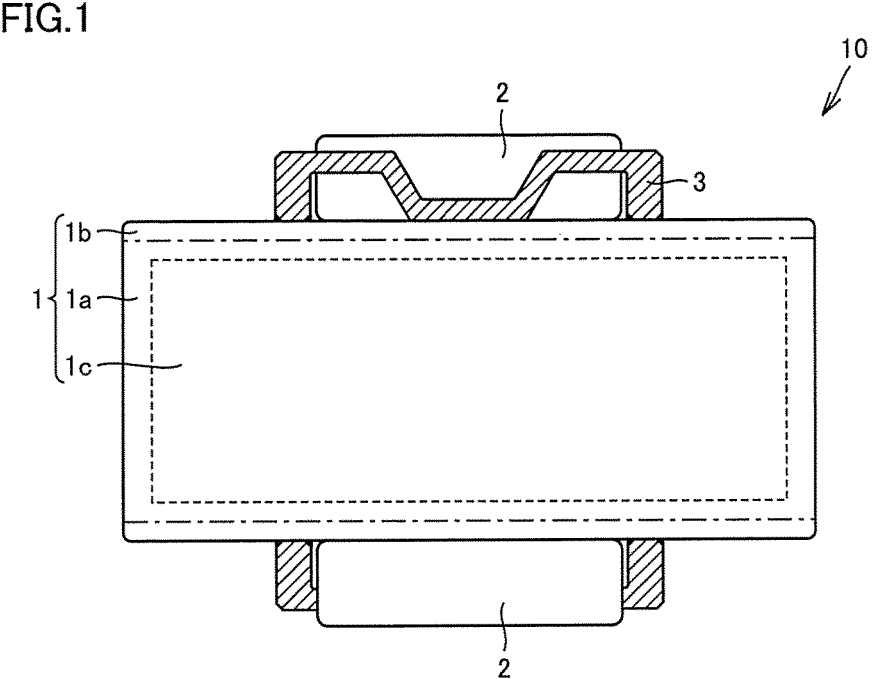
FIG. 1 is a sectional view schematically illustrating a bearing according to an embodiment.

FIG. 1 is a sectional view schematically illustrating a bearing 10 according to an embodiment. Hereinafter, the structure of the bearing according to the embodiment will be described with reference to FIG. 1.

As illustrated in FIG. 1, the bearing 10 includes a bearing shaft 1, a rolling element 2 which is a needle roller, and a cage 3. The bearing shaft 1 has a cylindrical shape. A plurality of rolling elements 2 are arranged on the side surface which serves as a raceway surface of the bearing shaft 1. The plurality of rolling elements 2 are arranged on the side surface of the bearing shaft 1 with intervals in the circumferential direction. The plurality of rolling elements 2 are arranged with equal intervals on the side surface of the bearing shaft 1.

The bearing shaft 1 is made of steel containing carbon of 0.7% or more. The raceway surface is formed with a nitrogen-enriched layer 1a. The nitrogen-enriched layer 1a has a higher nitrogen concentration than an inner peripheral layer 1c of the bearing shaft 1. The raceway surface is further formed with a hardened layer 1b provided on the surface of the nitrogen-enriched layer 1a. On the side surface of the bearing shaft 1, the absolute value of compressive residual stress in the surface of the nitrogen-enriched layer 1a (i.e., the surface of the hardened layer 1b) is 600 MPa or more and 1700 MPa or less.

The cage 3 is disposed on the side surface of the bearing shaft 1, and has an annular shape along the circumferential direction of the side surface. The cage 3 is formed with a plurality of pockets for housing therein the rolling elements 2. Since the rolling elements 2 are housed in the pockets, respectively, each rolling element 2 has a predefined position.

<Structure of Bearing Shaft>

Figure 2:
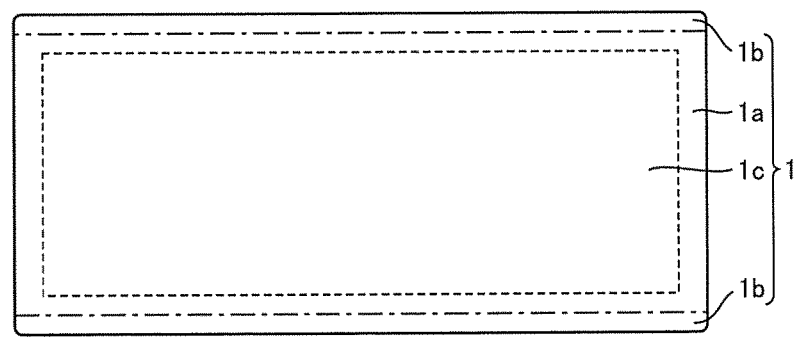
FIG. 2 is a sectional view schematically illustrating a bearing shaft constituting the bearing illustrated in FIG. 1.

FIG. 2 is a sectional view schematically illustrating the bearing shaft constituting the bearing illustrated in FIG. 1. Hereinafter, the structure of the bearing shaft 1 will be described in detail with reference to FIG. 2.

As illustrated in FIG. 2, a nitrogen-enriched layer 1a is formed on the surface (including a side surface serving as the raceway surface and an end surface extending in a direction crossing the side surface) of the bearing shaft 1. The side surface of the bearing shaft 1 is further formed with a hardened layer 1b provided on the surface of the nitrogen-enriched layer 1a. The hardened layer 1b is formed by shot peening. As described in the above, the absolute value of compressive residual stress in the surface of the hardened layer 1b is 600 MPa or more and 1700 MPa or less.

The surface hardness of the hardened layer 1b is 850 Hv or more and 1000 Hv or less. The surface roughness of the hardened layer 1b is 0.2 μm or less when calculated as arithmetic average roughness Ra. Furthermore, the amount of residual austenite in the hardened layer 1b is 9% or less by volume.

The bearing shaft 1 is made of, for example, high-carbon chromium bearing steel. For example, any steel satisfying the HS standard SUJ2 may be used to manufacture the bearing shaft 1.

<Structure of Needle Roller>

Figure 3:
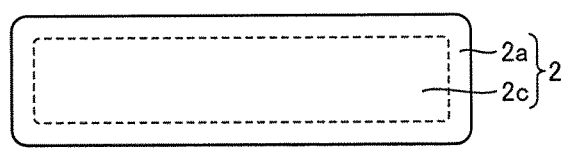
FIG. 3 is a sectional view schematically illustrating a needle roller constituting the bearing illustrated in FIG. 1.

FIG. 3 is a sectional view schematically illustrating the rolling element 2 constituting the bearing illustrated in FIG. 1. Hereinafter, the structure of the rolling element 2 will be described in detail with reference to FIG. 3.

As illustrated in FIG. 3, the rolling element 2 is a needle roller, and a nitrogen-enriched layer 2a is formed on the surface (including a side surface in contact with the bearing shaft 1 and an end surface extending in a direction crossing the side surface). The nitrogen-enriched layer 2a has a higher nitrogen concentration than an inner peripheral layer 2c of the rolling element 2. The amount of residual austenite in an outer portion of the surface of the rolling element is greater than the amount of residual austenite in an outer portion of the nitrogen-enriched layer formed on the raceway surface of the bearing shaft. Specifically, the amount of residual austenite in the outer portion of the surface of the rolling element surface is 9% or more and 50% or less by volume. The amount of residual austenite may exceed 9% by volume.

<Structure of Cage>

Figure 4:
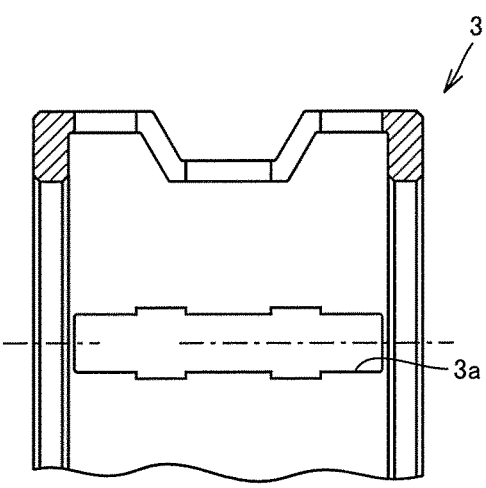
FIG. 4 is a partial sectional view schematically illustrating a cage constituting the bearing illustrated in FIG. 1.

FIG. 4 is a partial sectional view schematically illustrating a cage 3 constituting the bearing illustrated in FIG. 1. Hereinafter, the cage 3 will be described with reference to FIG. 4.

As described in the above, the cage 3 has an annular shape. The cage 3 is formed with a plurality of pockets 3a for housing therein the rolling elements 2 (see FIG. 1). The plurality of pockets 3a are formed at substantially equal intervals. The cage 3 may be formed from any suitable material. As an example, steel can be used to form the cage 3. The cage 3 may be formed by performing press processing on steel. In addition, the cage 3 may be formed from resin.

<Manufacturing Method>

As a manufacturing method for the bearing 10, firstly, the members (the bearing shaft 1, the rolling elements 2 and the cage 3) constituting the bearing 10 are prepared as follows, and then, the members are assembled to yield the bearing 10.

Manufacturing Method for the Bearing Shaft 1

As a manufacturing method for the bearing shaft 1 described in the above, firstly, a rod-shaped material (for example, a material satisfying the JIS standard SUJ2) is prepared from a steel having a composition suitable for manufacturing the bearing shaft 1. Then, the material is processed to have the shape of the bearing shaft 1 by performing a conventionally well-known machining process such as turning treatment on the material (machining process). Thereafter, a heat treatment is carried out. Specifically, the material which is processed as described in the above is subjected to a carbonitriding treatment, a refining treatment, a quenching treatment, a tempering treatment and the like. As a specific exemplary condition of the heat treatment, for example, the treatment temperature for the carbonitriding treatment is equal to or higher than A1 transformation point, and preferably within the temperature range of 800° C. or more and less than 1000° C.

Subsequently, the material is subjected to a finishing treatment by performing a conventionally well-known mechanical process such as grinding on the heat-treated material so as to enable it to have the dimensions of the bearing shaft 1.

Thereafter, the side surface (the side surface serving as the raceway surface) of the bearing shaft 1 is subjected to a shot peening treatment, and thereby, the bearing shaft 1 can be obtained. The sequence of the finishing treatment and the shot peening treatment which is described in the above may be changed so as to perform the shot peening treatment firstly.

Manufacturing Method for the Rolling Element 2

Any conventionally well-known manufacturing method can be used to manufacture the rolling element 2. For example, a rod-shaped material for manufacturing the rolling element 2 is prepared from steel (for example, high-carbon chromium bearing steel). Then, the material is processed to have the shape of the rolling element 2 by performing a conventionally well-known machining process on the material. Thereafter, a heat treatment step is carried out. Specifically, the material which is processed as described in the above is subjected to a carbonitriding treatment or the like. As a specific exemplary condition of the heat treatment, for example, the treatment temperature for the carbonitriding treatment is equal to or higher than A1 transformation point, and preferably within the temperature range of 800° C. or more and less than 1000° C.

Thereafter, the material is subjected to a finishing treatment by performing a conventionally well-known mechanical process such as grinding on the heat-treated material so as to enable it to have the dimensions of the rolling element 2. Thereby, the rolling element 2 can be obtained.

Manufacturing Method for the Cage 3

Any conventionally well-known manufacturing method can be used to manufacture the cage 3.

<Effects>

As described in the above, the bearing shaft 1 according to the embodiment is provided with an outer peripheral surface that includes a raceway surface (side surface) on which the rolling element 2 rolls, and is made of steel containing carbon of 0.7% or more. The raceway surface is formed with the nitrogen-enriched layer 1a. The absolute value of compressive residual stress in the surface of the nitrogen-enriched layer 1a (the surface of the hardened layer 1b formed by shot peening on the side surface of the bearing shaft 1) is 600 MPa or more and 1700 MPa or less.

Further, the bearing 10 according to the embodiment includes the bearing shaft 1 provided with an outer peripheral surface that includes a raceway surface, and the rolling element 2 that has a surface in contact with the raceway surface. The bearing shaft 1 is made of steel containing carbon of 0.7% or more. The raceway surface is formed with the nitrogen-enriched layer 1a. The absolute value of compressive residual stress in the surface of the nitrogen-enriched layer 1a (the surface of the hardened layer 1b) is 600 MPa or more and 1700 MPa or less.

Since a sufficiently large compressive residual stress is imparted to the surface of the nitrogen-enriched layer 1a (the surface of the hardened layer 1b) which is formed on the raceway surface, it is possible to prevent cracks from occurring on the surface and prevent cracks from progressing on the surface. Therefore, the fatigue cracking can be prevented from occurring on the surface of the bearing shaft 1. As a result, the fatigue resistance of the bearing shaft 1 is improved, which makes it possible to prolong the operation life of the bearing shaft 1 and the bearing 10. In the present disclosure, the compressive residual stress is measured by using X-ray diffraction method.

The lower limit of the absolute value of the compressive residual stress may be set to 1000 MPa, which makes it possible to definitely improve the fatigue resistance (for example, to prolong the operation life related to fatigue peeling) of the bearing shaft 1. The lower limit of the absolute value of the compressive residual stress may be set to 1300 MPa, which makes it possible to reliably improve the fatigue resistance of the bearing shaft 1.

In the bearing 10, the amount of residual austenite in an outer portion (nitrogen-enriched layer 2a) of the surface of the rolling element 2 may be greater than the amount of residual austenite in an outer portion (the hardened layer 1b) of the nitrogen-enriched layer 1a formed on the raceway surface of the bearing shaft 1. In the present disclosure, the amount of residual austenite is measured by using X-ray diffraction method.

Since the amount of residual austenite in the rolling element 2 is greater than the amount of residual austenite in the outer portion (the hardened layer 1b) of the bearing shaft 1, when a foreign matter is present between the raceway surface of the bearing shaft 1 and the rolling element 2, the surface of the rolling element 2 can deform in accordance with the foreign matter. Therefore, it is possible to reduce the possibility of occurrence of damage or cracks caused by the foreign matter on the bearing shaft 1.

The amount of residual austenite in the outer portion (the nitrogen-enriched layer 2a) of the surface of the rolling element 2 may be 9% or more and 50% or less by volume. If the amount of residual austenite in the outer portion of the rolling element 2 exceeds the upper limit of 50% by volume, it is highly possible that the dimensional change of the rolling element 2 caused by the transformation of the crystal structure at the time of use may adversely affect the bearing 10.

The upper limit of the amount of residual austenite in the outer portion of the rolling element 2 may be set to 30% by volume, which makes it possible to further reduce the influence of the dimensional change caused by the transformation of the crystal structure. The lower limit of the amount of residual austenite in the outer portion of the rolling element 2 may be set to 15% by volume. Thereby, when a foreign matter is present, the rolling element 2 can deform in accordance with the foreign matter, which makes it possible to further reduce the possibility of occurrence of damage caused by the foreign matter on the bearing shaft 1.

As described in the above, in the bearing 10, the nitrogen-enriched layer 2a is formed on the surface of the rolling element 2, which makes it possible to improve the fatigue strength and the abrasion resistance of the rolling element 2. Here, the nitrogen-enriched layer 2a is such a layer that the nitrogen concentration in the steel is increased relative to the nitrogen concentration in the raw steel.

In the bearing shaft 1, the surface hardness (Vickers hardness) of the nitrogen-enriched layer 1a (the hardened layer 1b) formed on the raceway surface (the side surface) is 850 Hv or more and 1000 Hv or less. Thus, the surface hardness of the hardened layer 1b is sufficiently high, which makes it possible to prevent any indentation or the like from being formed on the bearing shaft 1 due to the presence of a foreign matter. Therefore, it is possible to improve the durability of the bearing shaft 1 against fatigue peeling even when a foreign matter is present.

In the bearing shaft 1, the surface roughness of the nitrogen-enriched layer 1a (the surface roughness of the hardened layer 1b) formed on the raceway surface (side surface) is 0.2 μm or less when calculated as arithmetic average roughness Ra. In this way, the surface roughness of the bearing shaft 1 is prevented from being too large when the surface of the nitrogen-enriched layer 1a of the bearing shaft 1 (the surface of the hardened layer 1b) is used as a raceway surface on which the rolling element 2 rolls.

The maximum surface roughness of the nitrogen-enriched layer 1a (the surface roughness of the hardened layer 1b) calculated as the arithmetic mean roughness Ra may be 0.05 μm, which makes it possible for the rolling element to smoothly roll on the surface of the bearing shaft. The maximum surface roughness of the nitrogen-enriched layer calculated as the arithmetic mean roughness Ra may be 0.03 μm.

In the bearing shaft 1, the amount of residual austenite in the outer portion (the hardened layer 1b) of the nitrogen-enriched layer 1a formed on the raceway surface (side surface) is 9% by volume or less. Since the amount of residual austenite in the outer portion (the hardened layer 1b) is kept low, it is possible to sufficiently increase the hardness and the strength of the outer portion (the hardened layer 1b) constituting the raceway surface. In addition, the amount of residual austenite in the outer portion (the hardened layer 1b) may be 5% by volume or less, or 3% by volume or less. As described in the above, the steel used to manufacture the bearing shaft 1 is high-carbon chromium bearing steel. Thus, it is possible for the inner peripheral layer 1c of the bearing shaft 1 to have sufficiently high hardness and strength.

Modification Example

Figure 5:
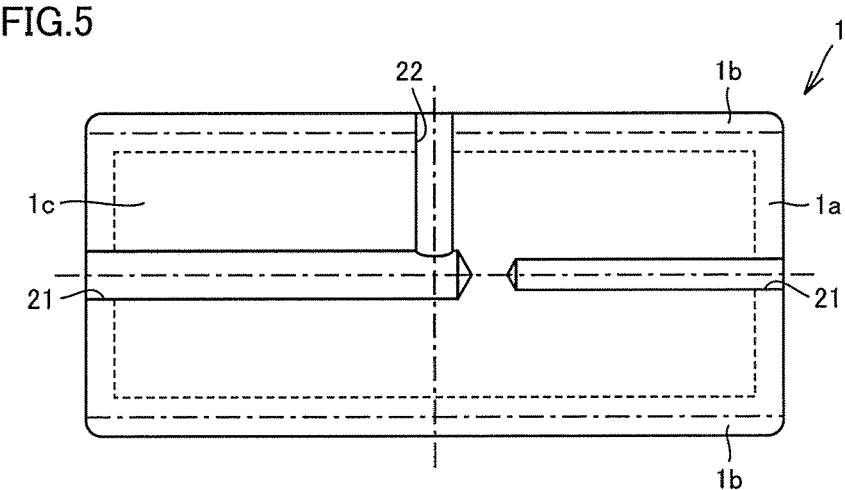
FIG. 5 is a sectional view schematically illustrating a modification example of the bearing shaft illustrated in FIG. 2.

FIG. 5 is a sectional view schematically illustrating a modification example of the bearing shaft 1 illustrated in FIG. 2. As illustrated in FIG. 5, the modification example of the bearing shaft 1, except that it is provided with an oil hole 21 extending along the center axis of the bearing shaft 1 from the end surface of the bearing shaft 1 and a branch hole 22 extending in the radial direction of the bearing shaft 1 and connected to the oil hole 21 inside the bearing shaft 1, which makes it different from the bearing shaft illustrated in FIG. 2, has substantially the same structure as the bearing shaft 1 illustrated in FIG. 2, and thereby may achieve the same effects. One end of the branch hole 22 reaches the side surface of the bearing shaft 1 (the raceway surface on which the rolling element 2 rolls) to form an opening on the side surface. By forming the oil hole 21 and the branch hole 22 as described in the above, it is easy to supply the lubricating oil to the contacting area between the bearing shaft 1 and the rolling element 2 via the oil hole 21 and the branch hole 22. The oil hole 21 may be provided so as to penetrate the bearing shaft 1 in the direction of the center axis.

Figure 6:
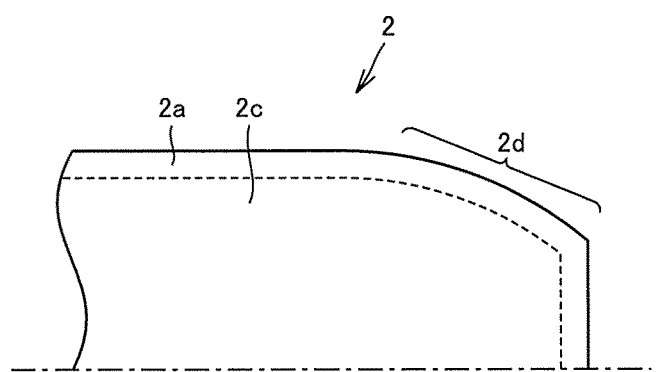
FIG. 6 is a partial sectional view schematically illustrating a modification example of the needle roller illustrated in FIG. 3.

FIG. 6 is a partial sectional view schematically illustrating a modification example of the rolling element 2 illustrated in FIG. 3. As illustrated in FIG. 6, except that a crown 2d is formed at both edges of the side surface in the axial direction of the rolling element 2, which makes it different from the rolling element 2 illustrated in FIG. 3, the modification example of the rolling element 2 has substantially the same structure as the rolling element 2 illustrated in FIG. 3, and thereby may achieve the same effects. In other words, the rolling element 2 in the bearing 10 is a crowned roller. Thus, it is possible to prevent the contact pressure from becoming locally greater in the contacting area between the bearing shaft 1 and the rolling element 2 at both edges of the rolling element 2. As a result, it is possible to prevent defects such as peeling from occurring on the bearing shaft 1. The rolling element 2 may be crowned to have any profile, and preferably it is crowned to have a logarithmic profile.

Figure 7:
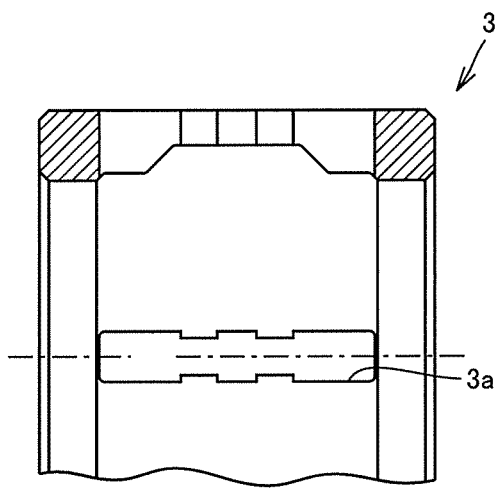
FIG. 7 is a partial sectional view schematically illustrating a modification example of the cage illustrated in FIG. 4.

FIG. 7 is a partial sectional view schematically illustrating a modification example of the cage 3 illustrated in FIG. 4. As illustrated in FIG. 7, the modification example of the cage 3 has substantially the same structure as the cage 3 illustrated in FIG. 4, except that the structure of the cage 3 (a column positioned between two adjacent pockets and extending along the central axis of the rolling element 2) is arranged outside the center axis of the rolling element 2 housed in the pocket, which makes it different from the cage 3 illustrated in FIG. 4. As illustrated in FIG. 7, by adopting such a configuration, the distance between the adjacent pockets of the modification example of the cage 3 is shorter than the cage 3 illustrated in FIG. 4, which makes it possible to house more rolling elements 2 than the cage 3 illustrated in FIG. 4. Therefore, compared with the cage illustrated in FIG. 4, the rated load of the bearing 10 can be increased.

Application Example

Figure 8:
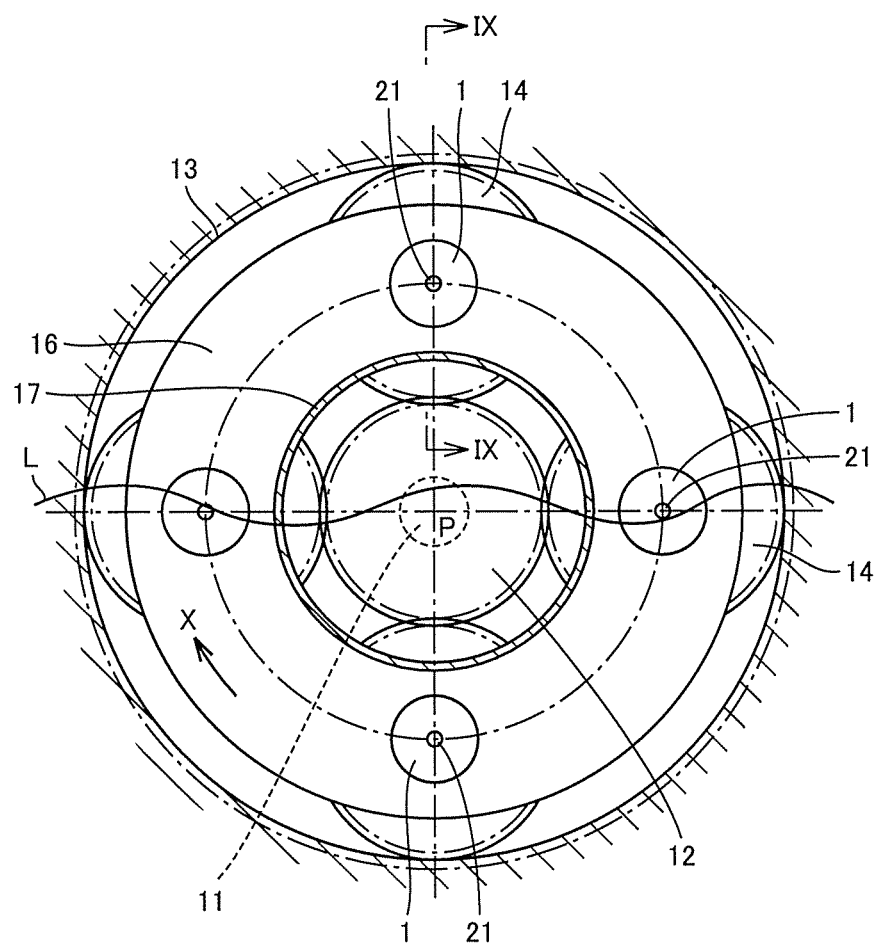
FIG. 8 is a schematic view illustrating a planetary gear speed reducer to which the bearing illustrated in FIG. 1 is applied.
Figure 9:
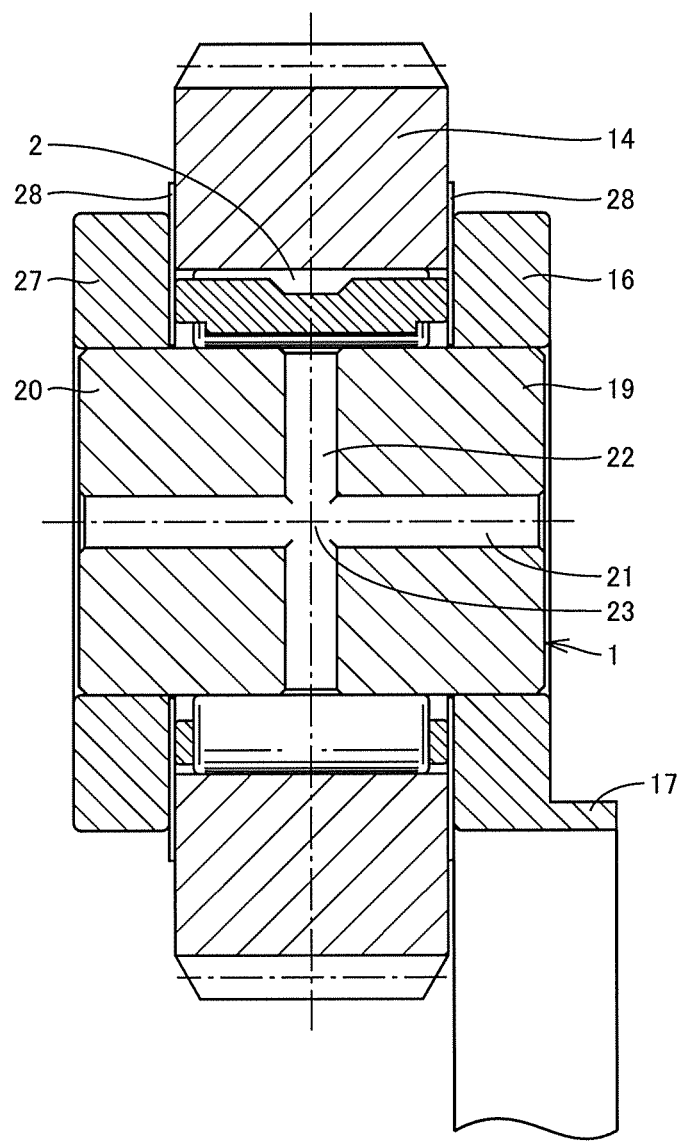
FIG. 9 is a schematic sectional view taken along line IX-IX in FIG. 8.

FIG. 8 is a schematic diagram illustrating a planetary gear speed reducer (also referred to as a planetary reduction gear) to which the bearing shaft 1 or the bearing 10 according to the embodiment is applied. FIG. 9 is a schematic sectional view taken partially along line IX-IX in FIG. 8. As illustrated in FIGS. 8 and 9, the planetary gear speed reducer to which the bearing shaft 1 or the bearing 10 according to the embodiment is applied includes an input shaft 11, a sun gear 12 mounted coaxially with the input shaft 11, an internal gear 13 fixed to a casing (not shown) of the gear speed reducer at the outer diameter side of the sun gear 12 and arranged concentrically with the sun gear 12, a plurality of planetary gears 14 arranged between the sun gear 12 and the internal gear 13 at equal intervals in the circumferential direction (in the drawing, at four places circumferentially separated from each other by about 90° as viewed from direction of the input shaft 11), a plurality of bearing shaft 1, each serving as a planetary pin for supporting each planetary gear 14 to rotate, an annular carrier 16 connecting all the bearing shafts 1 in a rotatable manner, and an output shaft 17 provided integrally and concentrically with the carrier 16.

As illustrated in FIG. 9, a rolling element 2 (needle roller) is disposed between the planetary gear 14 and the bearing shaft 1 serving as a planetary pin for supporting the planetary gear 14. The bearing shaft 1 is the bearing shaft 1 according to the embodiment, and the side surface (raceway surface) on which the rolling element 2 rolls is formed with the nitrogen-enriched layer 1a (see FIG. 1) and the hardened layer 1b (see FIG. 1). The rolling element 2 has the same configuration as the rolling element 2 illustrated in FIG. 3.

As illustrated in FIG. 9, the bearing shaft 1 is formed to extend from both sides of the planetary gear 14. One of the extensions of the bearing shaft 1 extending from the end surface of the planetary gear 14 is defined as an extension 19 and the other is defined as an extension 20. The oil hole 21 is provided to penetrate the bearing shaft 1 in the axial direction. The branch hole 22 is provided orthogonal to the oil hole 21 at an intersection 23 which is an intermediate portion of the oil hole 21. Each of two ends of the branch hole 22 form an opening on each side surface (outer diameter surface) of the bearing shaft 1.

The extension 19 described above is fixedly fitted to the carrier 16 with a plain bearing 28 (side washer) interposed between the planetary gear 14 and the carrier 16. The other extension 20 is also fixedly fitted to a retaining member 27 with the plain bearing 28 interposed between the planetary gear 14 and the retaining member 27. The retaining member 27 may be a separate member for each bearing shaft 1 of each planetary gear 14, and may be an annular member similar to the carrier 16. Alternatively, the retaining member 27 may be integrated with the carrier 16.

As described in the above, by applying the bearing shaft 1 and the rolling elements 2 according to the embodiment to the planetary gear 14, it is possible to improve the fatigue resistance of the bearing shaft 1, and thereby prolong the operation life of the bearing shaft 1, which makes it possible to prolong the operation life of the planetary gear speed reducer.

The above-mentioned planetary gear speed reducer may be lubricated via oil bath lubrication, for example, by immersing the gear speed reducer in lubricating oil approximately to the center thereof (see the lubricating oil surface L in FIG. 8). When the gear speed reducer is driven to work, the planetary gear 14 revolves while rotating around the center point P along the direction indicated by an arrow X in FIG. 8 to go in and out of the lubricating oil. When the planetary gear 14 is immersed in the lubricating oil, the lubricating oil flows into the oil hole 21 and is supplied to the contacting area between the rolling element 2 and the bearing shaft 1 via the branch hole 22.

Further, the above-mentioned planetary gear speed reducer may be integrated with a drive unit such as a motor. As an example, a hydraulic motor such as a conduction motor or a swash plate-type motor may be used as the drive unit. Furthermore, the planetary gear speed reducer according to the embodiment may be applied to, for example, a drive unit that drives a construction apparatus such as a caterpillar. In this case, the bearing shaft 1 without the oil hole 21 and the branch hole 22 being formed inside may be adopted.

Although the embodiment of the present invention has been described in the above, it may be modified in various ways. The scope of the present invention is not limited to the embodiment described above but defined by the scope of the claims and encompasses all modifications equivalent in meaning and scope to the claims.

INDUSTRIAL APPLICABILITY

The bearing shaft according to present invention is advantageously applicable to a planetary gear speed reducer or the like.

REFERENCE SIGNS LIST

1: bearing shaft; 1a, 2a: nitrogen-enriched layer; 1b: hardened layer; 1c, 2c: inner peripheral layer; 2: rolling elements; 2d: crown; 3: cage; 3a: pocket; 10: bearing; 11: input shaft; 12: sun gear; 13: internal gear; 14: planetary gear; 16: carrier; 17: output shaft; 19, 20: extension; 21: oil hole; 22: branch hole; 23: intersection; 27: retaining member; 28: plain bearing

The invention claimed is:

1. A bearing shaft provided with an outer peripheral surface that includes a raceway surface on which a rolling element rolls,
   the bearing shaft being made of steel containing carbon of 0.7% by mass or more,
   the raceway surface being formed with a nitrogen-enriched layer, and
   the absolute value of compressive residual stress in the surface of the nitrogen-enriched layer being 600 MPa or more and 1700 MPa or less.

2. The bearing shaft according to claim 1, wherein the surface hardness of the nitrogen-enriched layer is 850 Hv or more and 1000 Hv or less.

3. The bearing shaft according to claim 1, wherein the surface roughness of the nitrogen-enriched layer is 0.2 μm or less when calculated as arithmetic average roughness Ra.

4. The bearing shaft according to claim 1, wherein the amount of residual austenite in an outer portion of the nitrogen-enriched layer is 9% or less by volume.

5. The bearing shaft according to claim 1, wherein the steel is high-carbon chromium bearing steel.

6. A bearing comprising a bearing shaft provided with an outer peripheral surface that includes a raceway surface, and a rolling element that has a surface in contact with the raceway surface,
   the bearing shaft being made of steel containing carbon of 0.7% by mass or more,
   the raceway surface being formed with a nitrogen-enriched layer,
   the absolute value of compressive residual stress in the surface of the nitrogen-enriched layer being 600 MPa or more and 1700 MPa or less, and
   the amount of residual austenite in an outer portion of the surface of the rolling element being greater than the amount of residual austenite in an outer portion of the nitrogen-enriched layer formed on the raceway surface of the bearing shaft.

7. The bearing according to claim 6, wherein the surface of the rolling element is formed with a nitrogen-enriched layer.

8. The bearing according to claim 6, wherein the rolling element is a crowned roller.

9. The bearing according to claim 6, wherein the surface hardness of the nitrogen-enriched layer formed on the raceway surface of the bearing shaft is 850 Hv or more and 1000 Hv or less.

10. The bearing according to claim 6, wherein the surface roughness of the nitrogen-enriched layer formed on the raceway surface of the bearing shaft is 0.2 μm or less when calculated as arithmetic average roughness Ra.

11. The bearing according to claim 6, wherein the amount of residual austenite in an outer portion of the nitrogen-enriched layer formed on the raceway surface of the bearing shaft is 9% or less by volume.

12. The bearing according to claim 6, wherein the steel is high-carbon chromium bearing steel.

* * * * *